United States Patent
Molfa et al.

(10) Patent No.: US 11,022,225 B2
(45) Date of Patent: Jun. 1, 2021

(54) VALVE ASSEMBLY

(71) Applicant: Goodrich Corporation, Charlotte, NC (US)

(72) Inventors: Mateusz Molfa, Zdzieszowice (PL); Lukasz Wiktorko, Dolnośląskie (PL)

(73) Assignee: GOODRICH CORPORATION, Charlotte, NC (US)

( * ) Notice: Subject to any disclaimer, the term of this patent is extended or adjusted under 35 U.S.C. 154(b) by 118 days.

(21) Appl. No.: 16/380,020

(22) Filed: Apr. 10, 2019

(65) Prior Publication Data

US 2020/0018407 A1 Jan. 16, 2020

(30) Foreign Application Priority Data

Jul. 16, 2018 (EP) .................................. 18461576

(51) Int. Cl.
*F16K 17/40* (2006.01)
*F16K 17/16* (2006.01)

(52) U.S. Cl.
CPC .............. *F16K 13/04* (2013.01); *F16K 17/16* (2013.01)

(58) Field of Classification Search
CPC .................................. F16K 13/04; F16K 17/16
USPC ....................................................... 137/68.29
See application file for complete search history.

(56) References Cited

U.S. PATENT DOCUMENTS

| 3,008,479 | A | 11/1961 | Mancusi, Jr. |
| 3,029,982 | A | 4/1962 | Silverstone et al. |
| 3,633,596 | A | 1/1972 | Gerber |
| 4,006,780 | A | 2/1977 | Zehr |
| 4,269,386 | A | 5/1981 | Crowe |
| 4,475,664 | A | 10/1984 | Mackal |
| 6,260,570 | B1 * | 7/2001 | Wass .................. B63C 9/19 137/68.3 |
| 6,431,197 | B2 | 8/2002 | Hintzman et al. |

FOREIGN PATENT DOCUMENTS

| FR | 2252519 A1 | 6/1975 |
| FR | 2458015 A1 | 12/1980 |
| JP | 2002193170 A | 7/2002 |
| JP | 2014119044 A | 6/2014 |
| WO | 2012063020 A1 | 5/2012 |

OTHER PUBLICATIONS

Extended European Search Report for International Application No. 18461576.3 dated Jan. 16, 2019, 10 pages.

* cited by examiner

*Primary Examiner* — P. Macade Nichols
(74) *Attorney, Agent, or Firm* — Cantor Colburn LLP

(57) ABSTRACT

A valve assembly includes a valve housing defining therein a fluid flow channel between a first end arranged to be connected to a source of pressurised fluid, and an outlet a frangible member disposed within and across the fluid flow channel, rupture means for rupturing the frangible member and biasing means for biasing the means for rupturing into contact with the frangible member to cause rupture thereof. The assembly also includes retaining means for retaining the rupture means out of contact with the frangible member to prevent rupture thereof and release means configured to release the retaining means to allow the biasing means to bias the rupture means into contact with the frangible member. The retaining means includes a bearing extending to engage the biasing means and hold it in a compressed state and the assembly includes also includes securing means for securing the bearing in the engaged state.

9 Claims, 3 Drawing Sheets

VALVE ASSEMBLY

FOREIGN PRIORITY

This application claims priority to European Patent Application No. 18461576.3 filed Jul. 16, 2018, the entire contents of which is incorporated herein by reference.

TECHNICAL FIELD

The present disclosure relates to valve assemblies and in particular, but not exclusively, to a valve assembly provided between a pressurized fluid source and an inflatable device to be inflated on release of the fluid from the source, e.g. for an inflatable escape slide in an aircraft or for an inflatable rescue raft on a ship or the like.

BACKGROUND

Valves are used in many applications to allow/prevent or control the flow of fluid between a source and a destination. Valves are used, for example, in inflatable escape slides provided as emergency exits on aircraft. The escape slide is connected to a source e.g. a canister or cylinder of pressurised fluid. Generally, the valve is locked to prevent the fluid flowing from the cylinder into the slide or, indeed, escaping from the cylinder at all. The valve needs to be configured such that, in an emergency, it can be opened quickly and reliably, to automatically and immediately allow the inflation fluid to flow from the cylinder into the inflatable slide to activate and fully inflate the slide.

Inflatable escape slides and the pressure vessel containing the pressurised fluid for inflation and its regulating valve mechanism are stored in a compartment adjacent a door of an aircraft in a stowed, deflated state. When the door is closed, the emergency system is armed by means of a mechanical connection between the aircraft floor and the slide pack. To open the doors in a normal situation, the emergency system has to first be disarmed. In an emergency, or when evacuation is necessary, the deflated slide is deployed out of the door compartment. As the slide exits the aircraft, a trigger is actuated to open the valve to allow the fluid to flow to inflate the slide. Aircraft safety regulations for in-door evacuation slides require that the deployment and valve mechanism is purely mechanical, not relying on any electrical systems, and that the inflation is triggered by kinetic energy from the full weight of the slide falling out of the door. The valve should not, for example, be triggered by the pressure vessel being knocked or falling or some other impact on the vessel or some other, less than full deployment, movement of the slide.

The valve mechanism also needs to be arranged such that regardless of the orientation of the slide package as it falls out of the door, the valve can be triggered.

FIG. 1 shows an example of commonly used valve assemblies for evacuation slides as will be described further below. Valve assemblies are also disclosed in U.S. Pat. Nos. 6,431,197 and 4,269,386.

A problem with such assemblies is that they require several mechanical moving parts which result in more potential points of failure. The assemblies are also relatively bulky and heavy and complex and expensive to manufacture.

There is a need for a valve assembly that is simple, lightweight, can be triggered from all angles and is reliable.

SUMMARY

The present disclosure, in one aspect, provides a valve assembly comprising: a valve housing defining therein a fluid flow channel between a first end arranged to be connected to a source of pressurised fluid, and an outlet; a frangible member disposed within and across the fluid flow channel so as to block flow from the first end to the outlet; rupture means for rupturing the frangible member to allow flow from the first end to the outlet; biasing means for biasing the means for rupturing into contact with the frangible member to cause rupture thereof; and retaining means for retaining the rupture means out of contact with the frangible member to prevent rupture thereof; release means configured to release the retaining means to allow the biasing means to bias the rupture means into contact with the frangible member. The retaining means a bearing extending to engage the biasing means and hold it in a compressed state, against its bias. The valve assembly also includes securing means for securing the bearing in the engaged state. The release means comprises a trigger attached to the securing means which, when actuated, moves the securing means to release the bearing away from engagement with the biasing means whereby the biasing means expands to bias the rupture means into contact with the frangible member to cause rupture thereof.

Preferably, the frangible member comprises a disk or a membrane.

Preferably, the rupture means comprises a rod axially movable within the housing.

Preferably, the rod has a pointed end to rupture the frangible member.

Preferably, the biasing means comprises a spring in contact with the rupture means, biased to expand to bring the rupture means into contact with the frangible member.

Preferably, the bearing comprises two or more ball bearings mounted in a channel around the housing, the ball bearings extending into the housing to retain the biasing means in a non-biased state and the release means comprises a basket formed over a part of the housing and extending across at least part of the channel so as to hold the ball bearings in the state where they extend into the housing.

Preferably, the trigger comprises a wire or lanyard attached to the basket to lift the basket such that the ball bearings can move out of engagement with the biasing means so that the biasing means takes up its biased state.

Preferably, the ball bearings are attached to the basket.

Preferably, the trigger is fixed to the basket at a plurality of points.

Preferred embodiments will now be described by way of example only, with reference to the drawings.

DETAILED DESCRIPTION

Figure 1A:
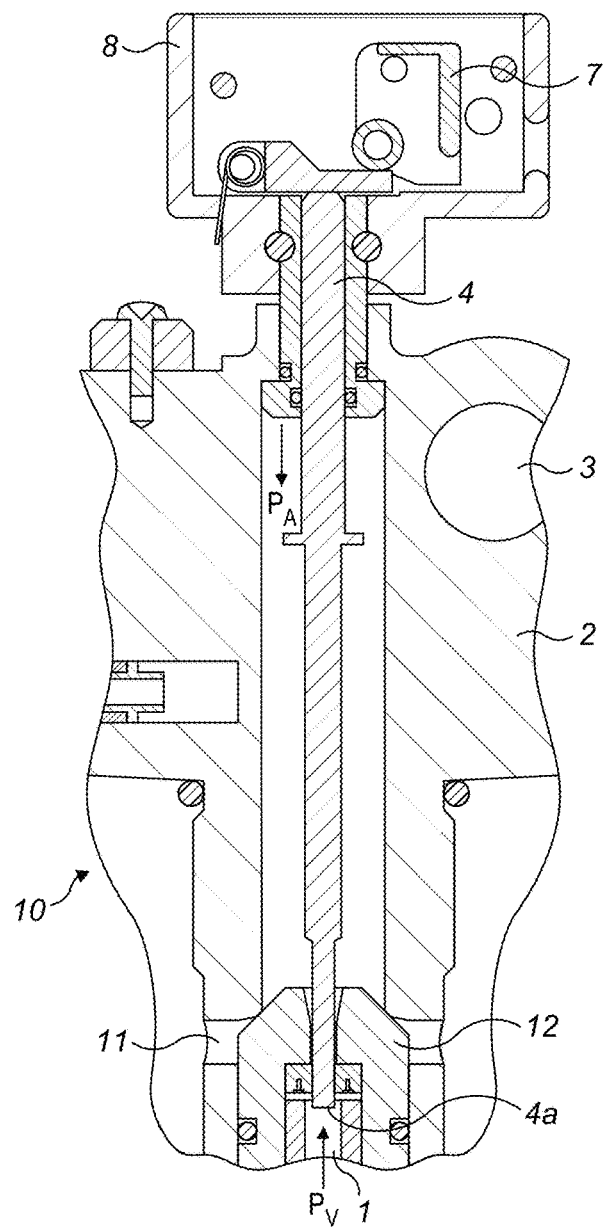
FIG. 1A is a cross-sectional view of a conventional valve assembly.
Figure 1B:
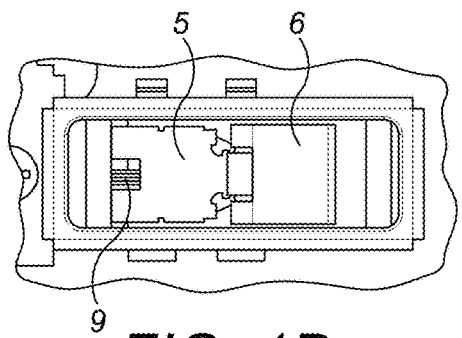
FIG. 1B is a top view of the assembly of FIG. 1A.

Referring first to FIGS. 1A and 1B a conventional valve assembly will be described by way of background. The assembly will be mainly described in relation to an aircraft evacuation slide, but such valve assemblies may find application in other areas, e.g. life rafts, off-shore emergency escape systems or, in fact, and inflatable objects.

The valve assembly 10 is mounted, in use, to the pressurised vessel containing the pressurised fluid (not shown) via a port 1 in a valve housing 2. A fluid channel is formed through the valve between the port 1 and an outlet 3 that, in use, is fluidly connected to the evacuation slide or other inflatable object (not shown). In normal circumstances, the inflatable objected is stowed and deflated and the fluid channel is closed by the valve to prevent fluid flowing from the vessel to the slide/object. In the example shown, the fluid channel is closed by means of a valve rod 4 mounted in the housing. The rod 4 is axially moveable in the housing but in the closed or locked position an end 4a of the rod 4 sits in or across the port. Generally, the pressure inside the vessel, Pv, is greater than atmospheric pressure PA, which pushes an insert 12 upwards so as to seal side channels 11, thus preventing fluid flow into the fluid channel to the outlet 3. The rod 4 is held in this closed position, against the pressure of the fluid, by means of a lever 5 that is spring biased and secured in the closed position by a cam 6 that, in turn, is secured in position by a trigger in the form of a removable pin or lanyard 7. The lever 5, cam 6 and trigger are all mounted in a rotatable housing part 8, which is arranged to rotate relative to the rod 4. The rotation is necessary because the trigger 7 can only be pulled out in one direction but, as the evacuation slide is deployed and falls from the aircraft, it will tumble and take on different orientations—the housing part 8 will thus rotate so that the trigger can always be pulled out at the required angle.

In the event of evacuation being required, the aircraft door (not shown) is opened and the deflated slide is ejected out of the door compartment. The trigger lanyard 7 is attached to the slide such that as the slide falls out, the full weight of the slide pulling on the cam 6 causes the cam 6 to rotate and unlock the lever 5. The lever 5, under the bias of the lever spring 9, is then released thus, in turn, releasing the rod 4. The rod 4 is then moved axially (upwards in FIG. 1A). This causes a reduction in the pressure difference between Pv and PA and fluid from the vessel can flow through the fluid channel this forcing the insert 12 down and opening the side channels 11. Fluid then flows from the vessel through the fluid channel and out of the outlet 3 into the slide to inflate the slide.

A problem with such conventional systems is that they require a relatively large number of metal/mechanical components such as springs, cams, levers etc. This all adds more potential points of failure and adds to the bulk and weight of the assembly as well is its complexity and cost of manufacture.

There is, therefore, a need for a simpler, lighter assembly that retains reliability and that can allow release of the valve at a large range of angles and that can be more easily and inexpensively manufactured and maintained.

Figure 2A:
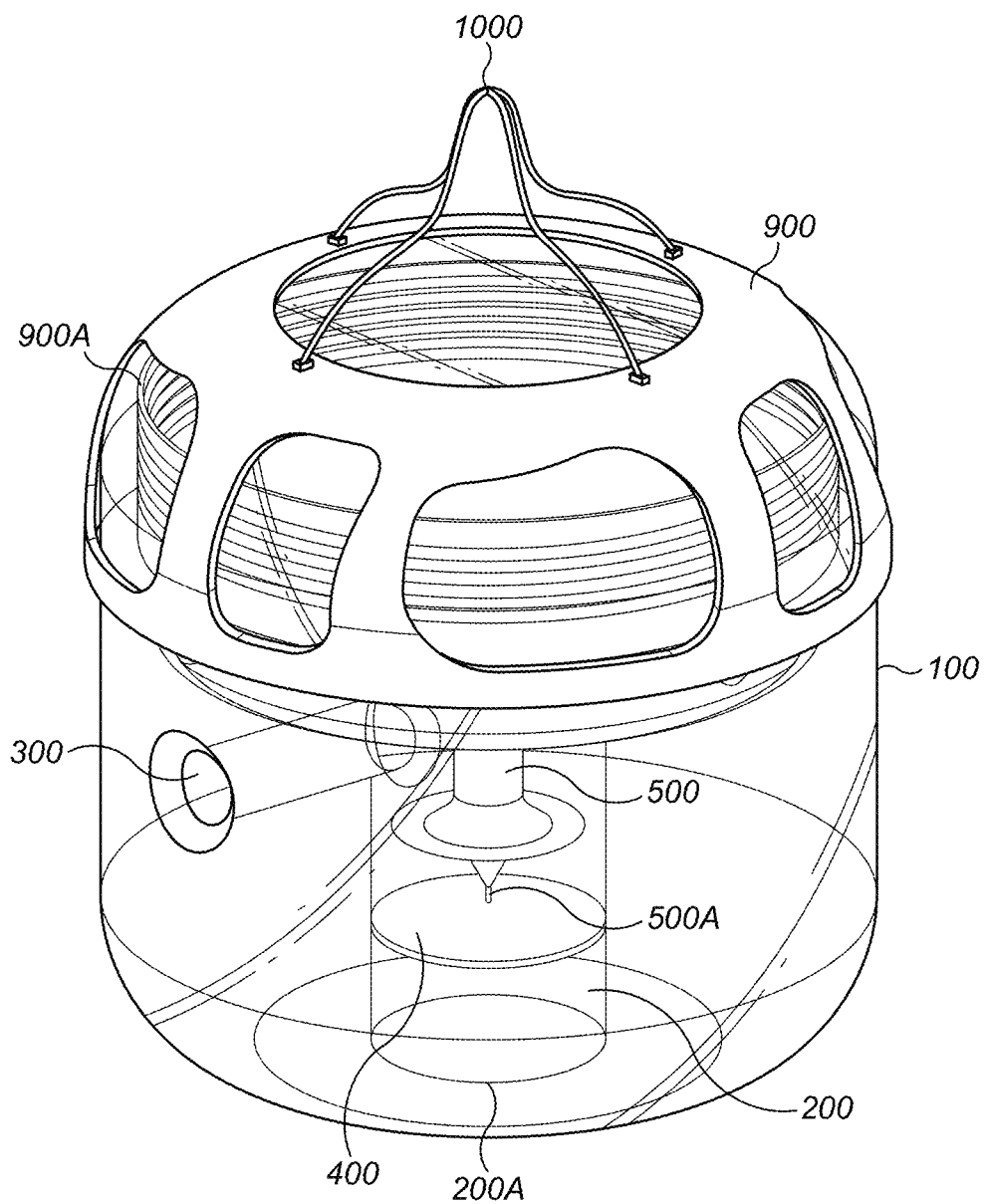
FIG. 2A is a perspective view of a valve assembly according to the present disclosure.
Figure 2B:
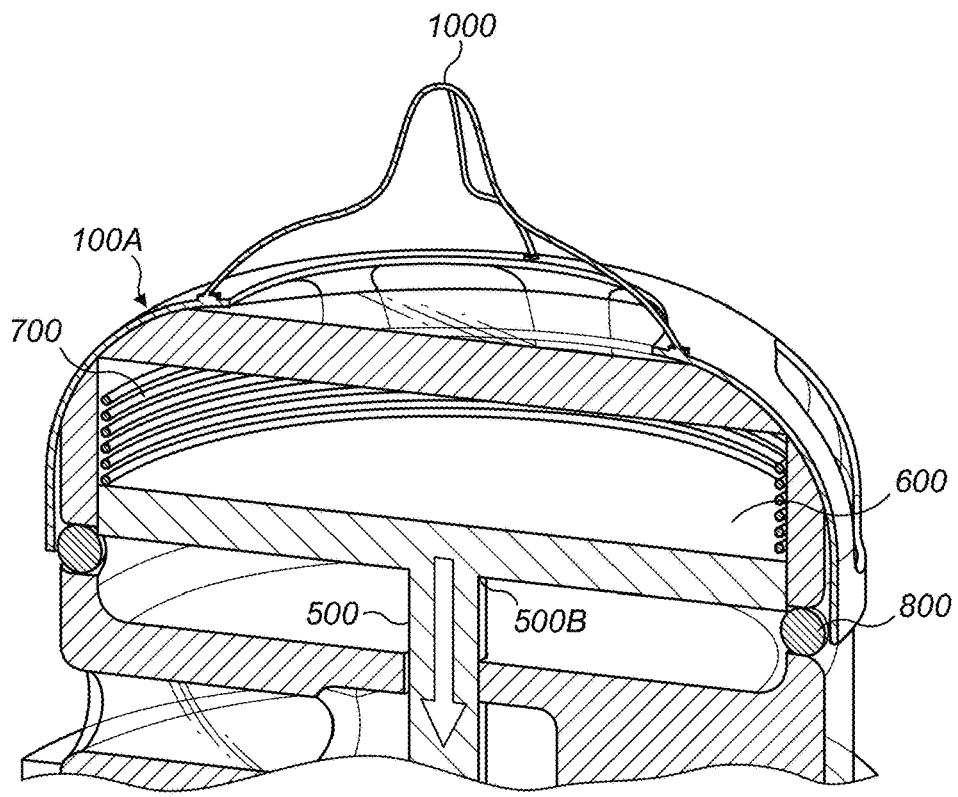
FIG. 2B is a cut-away view of the top part of the assembly of FIG. 2A.
Figure 2C:
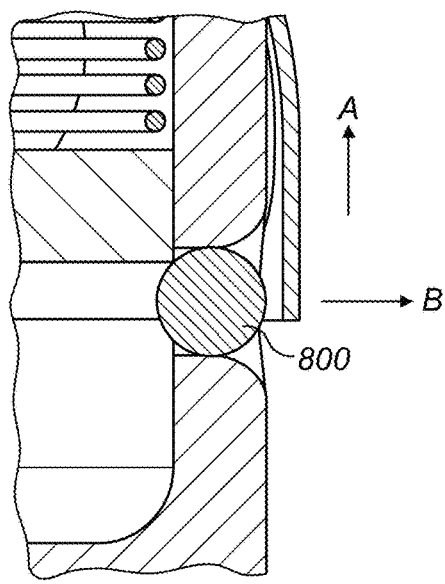
FIG. 2C is a detail from FIG. 2B.

Referring now to FIGS. 2A to 2C, the assembly of the present disclosure will now be described.

The present disclosure describes a so-called 'basket' valve assembly such as shown in the Figures. This comprises a housing 100 within which is defined a fluid channel 200 that is open at one end 200A for fluid connection to the pressure vessel (not shown). The fluid path is defined from the pressure vessel, through the fluid channel 200, out of the housing 100 via an outlet 300 to the slide or inflatable object (not shown).

In normal use, when the slide is deflated/stowed, the flow path is closed by means of a disk or membrane 400 across the diameter of the fluid channel. When the slide is required to be inflated, this disk 400 is ruptured as described in more detail below, allowing fluid to flow from the pressure vessel to the slide via the fluid channel 200 and the outlet 300.

Rupturing of the disk 400 is controlled by the valve mechanism now described.

A rod 500 is mounted in the housing extending into the fluid channel 200. A free end of the rod 500 is configured to rupture the disk 400 e.g. by piercing the disk when the rod 500 is brought into contact with the disk with sufficient force. In the example shown, the end of the rod 500 is pointed or sharpened like a needle 500A but other forms are also possible.

In the deflated/stowed state when the valve is closed, the end of the rod 500 is biased away from rupturing contact with the disk 400 by means of the mechanism shown most clearly in FIGS. 2B and 2C.

The rod 500 is mounted, by its other end 500B to a spring biased piston component 600 mounted in a top part 100A of the valve assembly housing 100. A spring 700 secures the piston component 600 within the top part of the housing and, in normal conditions (deflated) is compressed. One or more bearings 800 are provided and positioned to retain the piston component, against the force of the spring 700, in the top part of the housing which ensures that the free end 500A of the rod 500 does not come into rupturing contact with the disk 400. In the example shown, the bearings are in the form of two or more balls provided in a recess below the top part of the housing and extending radially into the housing sufficient to act as a detent against the piston component and to prevent the spring 700 from expanding.

The bearings 500 are secured in the detent configuration holding the piston component in position, by means of a basket 900 of preferably lightweight material having some flexibility. The basket 900 is fitted over the top part of the housing and extends across the bearings to secure them in the position where they act as a detent for the piston component. The basket may or may not be attached to the bearings.

The basket 900 is, as mentioned above, preferably made of a lightweight material and can be made e.g. by 3D print/additive manufacture. The basket should fit around the top portion of the housing but does not need to be a complete cover and can have, as shown, spaces 900A in coverage which adds to the lightweight advantage.

A trigger 1000 is attached to the basket and attaches the basket, in use, to the slide.

The trigger is again preferably a lightweight component such as a light cable or wire or spring and its purpose is to pull the basket at least partially off from the top portion of the housing, as shown by the arrow A in FIG. 2C under the weight of the slide as it falls from the aircraft door on deployment. The attachment between the trigger and the slide and the valve assembly such be such that the full weight of the falling slide is at least sufficient to lift the basket so that it no longer covers the bearings 800 or, if attached to the bearings, that it lifts the bearings out of engagement with the piston component.

Preferably, the trigger has several points of attachment to the basket, with these being evenly spaced, so that the trigger force of the falling slide lifts the basket away from the bearings or lifts the basket and connected bearings away from contact with the piston component in a relatively equal and uniform manner. In the drawings four points of contact are shown but other variations are of course possible.

On deployment, then, the deployed slide pulls on the trigger 1000 with enough force to lift the basket 900 so that it no longer extends over the bearings 800. The force of the spring 700 acting down on the piston component 600 is then sufficient to push the bearings radially outwards in the direction of arrow B so that they no longer retain the piston component in the top portion of the housing. The bias of the spring 700 then pushes the rod 500 down and the spring and rod are configured such that the free end 500A impacts against the disk 400 causing the disk to rupture. This then opens the fluid channel 200 and the pressurised fluid flows from the pressure vessel into the slide, inflating the slide.

The bearings are mounted in the housing such that they can rotate relative to the housing—e.g. in a recess formed around the housing periphery. This also enables the basket to rotate relative to the housing. This rotation means that the valve can be reliably triggered regardless of the orientation of the assembly as the slide is deployed.

Whilst deployment has been described in relation to an evacuation slide falling from a door of an aircraft, in other applications, the trigger can be activated by other movement or force provided it is sufficient to lift the basked so as to release the piston component.

The described valve assembly provides a lightweight, simple, yet reliable solution to controlling fluid flow for inflation of an object from a pressurised fluid source. By 3D printing the basket using composite materials a single piece of material can be used.

The invention claimed is:

1. A valve assembly comprising:
   a valve housing defining therein a fluid flow channel between a first end arranged to be connected to a source of pressurised fluid, and an outlet;
   a frangible member disposed within and across the fluid flow channel so as to block flow from the first end to the outlet;
   rupture means for rupturing the frangible member to allow flow from the first end to the outlet;
   biasing means for biasing the means for rupturing into contact with the frangible member to cause rupture thereof;
   retaining means for retaining the rupture means out of contact with the frangible member to prevent rupture thereof, wherein the retaining means includes a bearing extending to engage the biasing means and hold it in a compressed state, against its bias;
   release means configured to release the retaining means to allow the biasing means to bias the rupture means into contact with the frangible member; and
   securing means for securing the bearing in the engaged state;
   wherein the release means comprises a trigger attached to the securing means which, when actuated, moves the securing means to release the bearing away from engagement with the biasing means whereby the biasing means expands to bias the rupture means into contact with the frangible member to cause rupture thereof;
   wherein the bearing comprises two or more ball bearings mounted in a channel around the housing, the ball bearings extending into the housing to retain the biasing means in a non-biased state;
   wherein the release means comprises a basket formed over a part of the housing and extending across at least part of the channel so as to hold the ball bearings in the state where they extend into the housing.

2. The valve assembly of claim 1, wherein the frangible member comprises a disk or a membrane.

3. The valve assembly of claim 1, wherein the rupture means comprises a rod axially movable within the housing.

4. The valve assembly of claim 3, wherein the rod has a pointed end to rupture the frangible member.

5. The valve assembly of claim 1, wherein the biasing means comprises a spring in contact with the rupture means, biased to expand to bring the rupture means into contact with the frangible member.

6. The valve assembly of claim 1, wherein the trigger comprises a wire or lanyard attached to the basket to lift the basket such that the ball bearings can move out of engagement with the biasing means so that the biasing means takes up its biased state.

7. The valve assembly of claim 1, wherein the ball bearings are attached to the basket.

8. The valve assembly of claim 6, wherein the ball bearings are attached to the basket.

9. The valve assembly of claim 6, wherein the trigger is fixed to the basket at a plurality of points.

\* \* \* \* \*